US006944169B1

(12) United States Patent
Yoshizawa et al.

(10) Patent No.: US 6,944,169 B1
(45) Date of Patent: Sep. 13, 2005

(54) METHOD AND APPARATUS FOR MANAGING QUALITY OF SERVICE IN NETWORK DEVICES

(75) Inventors: Satoshi Yoshizawa, Saratoga, CA (US); Kenichi Otsuki, Palo Alto, CA (US)

(73) Assignee: Hitachi America, Ltd., Brisbane, CA (US)

( * ) Notice: Subject to any disclaimer, the term of this patent is extended or adjusted under 35 U.S.C. 154(b) by 0 days.

(21) Appl. No.: 09/516,331

(22) Filed: Mar. 1, 2000

(51) Int. Cl.$^7$ ............................................ H04L 12/28
(52) U.S. Cl. ..................... 370/410; 370/526; 709/226
(58) Field of Search ................................ 370/351, 352, 370/353, 310, 328, 329, 330, 465, 466, 468, 370/389, 382, 254, 255, 390, 395.21, 523, 370/525, 522; 709/224, 223, 225, 278, 226

(56) References Cited

U.S. PATENT DOCUMENTS

| | | | |
|---|---|---|---|
| 6,085,252 A | 7/2000 | Zhu et al. | |
| 6,091,709 A | 7/2000 | Harrison et al. | |
| 6,104,700 A | 8/2000 | Haddock et al. | |
| 6,154,776 A * | 11/2000 | Martin | 709/226 |
| 6,157,955 A * | 12/2000 | Narad et al. | 709/228 |
| 6,226,277 B1 | 5/2001 | Chuah | |
| 6,246,702 B1 | 6/2001 | Fellman et al. | |
| 6,278,693 B1 | 8/2001 | Aldred et al. | |
| 6,292,465 B1 | 9/2001 | Vaid et al. | |
| 6,308,216 B1 * | 10/2001 | Goldszmidt et al. | 709/236 |
| 6,317,438 B1 | 11/2001 | Trebes, Jr. | |
| 6,327,254 B1 | 12/2001 | Chuah | |
| 6,335,927 B1 | 1/2002 | Elliot et al. | |
| 6,341,309 B1 | 1/2002 | Vaid et al. | |
| 6,407,999 B1 * | 6/2002 | Olkkonen et al. | 370/389 |
| 6,434,624 B1 * | 8/2002 | Gai et al. | 709/232 |
| 6,466,984 B1 * | 10/2002 | Naveh et al. | 709/228 |
| 6,651,101 B1 * | 11/2003 | Gai et al. | 709/224 |
| 6,661,780 B2 * | 12/2003 | Li | 370/324 |
| 6,732,168 B1 * | 5/2004 | Bearden et al. | 709/223 |
| 6,745,246 B1 * | 6/2004 | Erimli et al. | 709/238 |
| 6,763,392 B1 * | 7/2004 | del Val et al. | 709/231 |

OTHER PUBLICATIONS

IETF, "An Architecture for Differntiated Services," RFC2475, pp 1-36, Dec. 1998.
Tennenhouse, D.L., et al., "Towards an Active Network Architecture", SPIE Computer Communication review, vol. 26, No. 2, 1996.
Tennenhouse, D.L., et al., "A Survey of Active Network Research", IEEE Communications Magazine, Jan. 1997, pp 80-86, 1997.
Lazar, A., "Programming Telecommunication Networks", IEEE Network, Sep./Oct. 1997, pp 8-18, 1997.

(Continued)

*Primary Examiner*—Chau Nguyen
*Assistant Examiner*—Ricardo Pizarro
(74) *Attorney, Agent, or Firm*—Townsend and Townsend and Crew LLP

(57) ABSTRACT

A network system comprises a network of data sources interconnecting plural clients by way plural network devices. A data server achieves flexibility in its use of network resources by altering the attributes of one or more network devices along the communication channels between the data server and the plural clients. This is accomplished during the normal course of data transmissions to the plural clients, thus providing real time control over the network device attribute. The invention is particularly useful in data servers, such as a video server system, in which data transmissions are characterized by a long sequence of data packets.

58 Claims, 12 Drawing Sheets

OTHER PUBLICATIONS

Biswas, J., et al,. "The IEEE P 1520 Standards Initiative for Programmable Network Interfaces", IEEE Communications, Special Issue on Programmable Networks, vol. 36, No. 10, Oct. 1998.

Toshiaki Suzuki, "Scalable MPEG-2 Video Transmission System over IP Network", International Telecommunication Union, Meeting of Study Group 16, May 1999.

David L. Tennenhouse et al., Telemedia, Networks and Systems Group, MIT, *Towards an Active Network Archetecture*, Computer Communication Review, pp. 5-18.

David L. Tennenhouse et al., *A Survey of Active Network Research* IEEE Communication Magazine, Jan. 1997, pp. 80-86.

Aurel A. Lazar, *Programming Telecommunication Networks*, IEEE Network, Sep./Oct. 1997, pp. 8-18.

Jit Biswas et al., *The IEEE P1520 Standards Initiative for Programmable Network Interfaces*, IEEE Communications Magazine, Oct. 1998. pp. 64-70.

S. Blake et al.,*An Architecture for Differentiated Services*, Informational, Dec. 1998, pp. 1-36.

* cited by examiner

```
struct END_POINT {
        IP_ADDRESS         ipaddr ;       /* may be range of addresses */
        unsigned short     port ;         /* may be range of ports     */
        ...
};

struct FLOW {
        END_POINT          source ;
        END_POINT          destination ;
        ...
        octet              protocol_id ;
        ...
};

struct ACTION {
        ...
        /* Specify priority, mode (DISCARD), etc), etc.                                 */
        /* Could be a list, relating values of particular packet field to an ACTION     */
        ...
};

enum FLAG { CHANGE_IMMEDIATE, CHANGE_SYNCHRONOUS } ;

boolean Set_QoS ( in FLOW target_flow, in ACTION new_action, in FLAG flag ) ;
```

FIG. 6 boolean Set_QoS ( in FLOW target_flow, in ACTION new_action, in octet mask ) ;

*FIG. 10* enum HEADER_FIELD { TOS_FIELD, ... } ;

typedef sequence<octet>    FIELD_VALUE ;

struct PAYLOAD_FIELD {
    unsigned short    offset_position ;
    unsigned short    field_field ;
} ;

enum MASK_POSITION { IN_HEADER, IN_PAYLOAD } ;

union MASK switch (MASK_POSITION) {
    case IN_HEADER:
        HEADER_FIELD    target_header_field ;
        FIELD_VALUE    field_value ;
    case IN_PAYLOAD ;
        PAYLOAD_FIELD    target_payload_field ;
        FIELD_VALUE    field_value ;
} ;

boolean Set_QoS ( in FLOW target_flow, in ACTION new_action, in MASK mask ) ;

*FIG. 11* boolean Set_QoS ( in FLOW target_flow, in ACTION new_action ) ;

boolean Commit_Change ( in MASK mask ) ;

*FIG. 12*

METHOD AND APPARATUS FOR MANAGING QUALITY OF SERVICE IN NETWORK DEVICES

BACKGROUND OF THE INVENTION

The present invention relates to telecommunication networking in general, and in particular to network devices as they pertain to service levels for data delivery. More specifically, the present invention relates to the real-time adjustment of quality-related attributes in network devices.

Router and switch devices are used for connecting networks (e.g., LANs, WANs, and the like) and for transferring datagrams from one network to another. Datagrams contain communication data (payload) as well as a source address and a final destination address. A widely used datagram format is the transmission control protocol/internet protocol (TCP/IP) format. A switch simply provides routing of incoming datagrams to a specific output port based on the destination information contained in the datagram. A router, likewise, will send a datagram to an intermediate destination which ultimately results in the final destination. The router, however, will select from among many intermediate destinations depending on criteria such as traffic conditions, availability, and the like.

Hosts coupled in a network carry a variety of kinds of data. Certain types of data transmissions (or data flows) may require a certain level of quality from the network. A common attribute is Quality of Service (QoS). For example, the transmission of video data and/or voice data typically requires a higher QoS than is typically needed when transferring data to display a World Wide Web (WWW) page in order to ensure a smooth presentation of the video and/or voice content. This especially the case for audio content because human hearing is very sensitive to degradations in audio transmissions, even as compared to video transmissions. However, when viewing a web page, delays in displaying the page contents resulting from a lower QoS can be tolerated.

QoS can manifest itself in various ways. For example, QoS may specify a minimum bandwidth requirement, a maximum transmission delay, or an amount of memory or buffer space required for the data flow. Thus, a video conference or other real-time data transmission may have a high QoS, requiring substantial bandwidth and minimum delay from the network. By specifying the QoS required for a particular data flow, the data source or destination can ascertain whether an acceptable path is available. Thus, QoS routing allows data flows to be routed around links that lack the necessary resources.

In a typical operating environment of an Internet protocol (IP) router or switch (collectively referred to herein as network devices), there is a system administrator who will adjust the QoS setting in the course of performing various administrative tasks. Alternatively, an automated administration-type controller responsible for managing a set of network devices might periodically adjust the QoS settings in response to traffic conditions within the domain serviced by the network devices.

The flowchart shown in FIG. 15 highlights the steps of a conventional approach to changing the QoS setting in a network device. The administrator, whether a human or an automated controller, typically gains access to the network device via a maintenance channel. This can be a logical channel such as a telnet session accessed over one of the local area network (LAN) interfaces on the network device, e.g., an ethernet port. Alternatively, the network device might have a serial port or the like having a connection to a PC. Through the use of service software contained in the network device, an administration command to change the QoS setting is submitted, step 1504. The administration command is communicated to an internal controller of the network device, step 1506, by way of a suitable protocol standard, command interface, or application program interface (API). For current technology, the use of a management/maintenance protocol such as SNMP (Simple Network Management Protocol) is most common. In addition to the protocol support, most devices have a command interface primarily to support proprietary features of the devices. There, a controller computer within the network device extracts QoS parameters from the command and updates the contents of a QoS table, step 1508. Typically, this sequence is executed rather infrequently, on the order of once every few hours or longer.

In current network usage scenarios, most QoS allocations are given on a per-request basis. For example, let's imagine that we want to hold a tele-conference from 1 P.M. to 3 P.M. on a particular date. In this case, we give a request to the administrator (humans or computer) to allocate particular QoS at the network devices involved in the conference (not necessarily one-to-one, but multiple points may be involved). The administrator can then set a trigger mechanism for the command to be sent to the network devices at 1 P.M. (or 12:55), so as to provide support the tele-conference session.

In the future, it is envisioned that the QoS control would not be applied just in a "session-oriented" time granularity as mentioned above, but rather in "real-time" granularity. For example, you may want to change the QoS setting at a particular device amidst transmitting a flow of video data, depending on the content. There could be scenes (of few minutes in duration) in the video that mainly consist of still pictures where the bandwidth requirement becomes lower. So, rather than reserving a particular bandwidth for the entire duration of the video flow (which could be in the order of hours), we want to change the QoS in a more "dynamic" manner so as to use the entire network resources in a more efficient manner.

However, when changing QoS dynamically during the transmission of data in this way, a problem presents itself since the timing of QoS changes and the flow of data is not linked (synchronized). For example, the transmission of an image requires communicating numerous image-data packets from a server source to a client destination. Suppose, in an attempt to raise transmission priority, the QoS is changed in the midst of the stream of image-data packets. As a consequence, the later transmitted image-data packets could arrive prior to the earlier transmitted packets. In such a case, the packets arriving at the destination would be out of sequence.

The destination site might be able to compensate by the use of additional software that receives the packets and buffers them. The software can then re-sequence the packets and display the image properly. Alternatively, the receiving software can implement a very large buffer to store the entire image before displaying it. In either case, the additional complexity in the client-side software is undesirable and degrades performance. Moreover, the latter solution further suffers from the requirement of additional memory, either real or virtual (which would further degrade performance from to the likelihood of additional delay due to increased disk swapping). In the case of a video stream, buffering may not work altogether because of the large amounts of data in a live video feed and the real time aspects of live action video. In such situations, data packets arriving out of sequence might be discarded, resulting in a garbled video image.

Typical schemes for adjusting the QoS of a network device are known. For example, the "differentiated services" architecture defined by the Internet Engineering Task Force (IETF) uses an IP-layer packet marking scheme to convey a desired QoS. The IP header contains a differentiated services code point (DSCP) field. The DSCP is used to map each packet to a particular transmission priority in the network device. The mapping between the DSCP value and the transmission priority typically is set by the network management system prior to the start of a transmission. The mapping remains unchanged until the transmission is complete. In this scheme, there is no mechanism for changing the mapping during a transmission.

In an "active networks," users can insert customized programs into the data stream. The packet of data contains a program that is executed by one or more network devices encountered along its journey to the destination. Thus, a program can be written and inserted into the data stream to control the QoS behavior at the network nodes. A disadvantage with this approach is that the encapsulation of the program into the packet limits the amount of payload the packet can carry. Though the versatility and flexibility of active networks provide fine control over the QoS on a packet-by-packet basis, this capability occurs at the cost of having to provide software execution at each network device. The extra processing can degrade the performance of network transmissions.

In a class of networks known as programmable networks, currently being defined by the IEEE Society, the resources of a network are represented as software abstractions. The software interacts with the network devices through means of a set of standardized application program interfaces (API's). By abstracting resources related to switching functionality such as signaling services and quality level services, the goal is to facilitate the development and deployment of new services.

There is a general need to provide better utilization of network resources and more flexible services. Adjusting the QoS permits the data service provider with the capability to improve resource utilization for its users. The service provider can then design new services and more flexible and equitable billing policies by having finer control over the data transmission. In this way, for example, premium users can be allocated greater bandwidth than would be normally provided for an average user. In other situations, bandwidth allocation might be readjusted among the users to accommodate changing traffic conditions. Similarly, transmission delays can be controlled as needed to improve transmission times for resource-intensive applications such as video conferencing connections. A need exists for an approach which can realize the foregoing benefits.

SUMMARY OF THE INVENTION

The present invention allows a data service provider to communicate information to one or more network devices so to alter at least one transmission attribute in the network device during the normal course of data transmissions to its clients. The data service provider is then able to tailor appropriate service levels for its various clients by more effectively allocating network resource. The data service provider can effectively react to changing traffic conditions by reallocating resources among all of its clients. Additional services and more flexible billing policies can be developed.

In an aspect of the invention, a data delivery system includes a data server in data communication with one or more network devices. Accordingly, there is the transmission of first information to a targeted network device, a current network device attribute of which is to be changed. The transmission of first information originates from the data server. The first information comprises at least one new network device attribute, which is stored in the network device. A transmission of second information to the target network device is subsequently produced by the data server. The second information acts as a trigger, activating the network device to update its current attribute setting with the new attribute setting. Therefore, dynamic real-time adjustments to the network device attribute becomes feasible.

In accordance with this aspect of the invention, the first information may also contain addressing information to identify the targeted network device(s). The second information can be contained in a client-destined data packet. The new attribute setting in the targeted network device is put into effect prior to sending the data packet containing the second information which triggers the new attribute setting activity. Alternatively, the activity occurs subsequent to transmission of the data packet containing the second information.

In accordance with another aspect of the invention, either or both the first and second information can be contained in special data packets that are intercepted by the network device.

In a particular aspect of the invention, the network device attribute being adjsuted is a quality of service (QoS) setting, and the first information contains QoS parameters which specify a QoS setting. In one variation of this particular aspect of the invention, the first information contains a list of QoS parameters. In another variation of this particular aspect of the invention, a list of QoS parameters is built up in the targeted network device, and the second information contains an index into the list of QoS parameters.

In yet another aspect of the invention, a network device includes network circuitry coupled to a network for receiving data packets from the network. There is data monitoring circuitry to detect the presence of a received data packet containing first information. A first program code is provided to receive one or more externally provided QoS parameters. A second program code is provided to alter the QoS setting of the network device in accordance with the externally provided QoS parameters in response to detecting the first information.

BRIEF DESCRIPTION OF THE DRAWINGS

FIG. 6 is an API highlighting the features for setting the flow control table in accordance with the present invention.

FIGS. 10–12 are variations of API's highlighting the features for setting the flow control table of FIG. 7

DESCRIPTION OF THE SPECIFIC EMBODIMENTS

Purely as a vehicle for explaining the inventive features and benefits of the present invention, an embodiment of the invention provides for a network service deployed over a programmable network. In the exemplary embodiment, the network service is provided in accordance with the Multi-Quality Layered Video Service (MQLVS) model for delivering video data, as discussed in a paper presented by T. Suzuki at the Meeting of Study Group 16 during the International Telecommunication Union on May 1999, entitled "Scalable MPEG-2 Video Transmission System over IP Network," and incorporated herein in full for all purposes.

Figure 1:
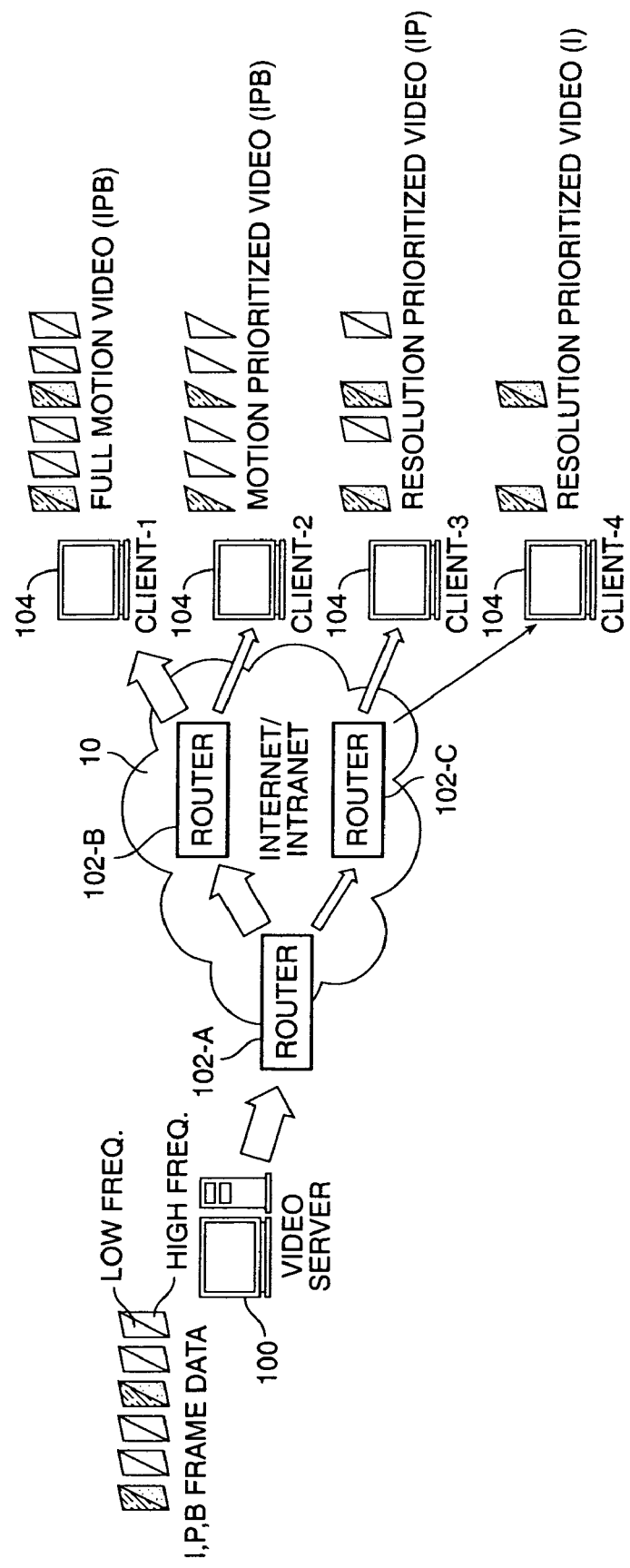
FIG. 1 is a simplified system diagram of a typical data server application over a network which operates in accordance with the present invention.

FIG. 1 is a simplified system diagram of one such programmable network. A video server 100 transmits a video program over a network 10 to various clients 104. The network 10 comprises the Internet which is a global amalgamation of networks and network device. Alternatively, network 10 can be a more localized intranet. The network is defined by the interconnection of a multitude of network devices 102, including routing devices and switching devices. At the receiving end of video server 100 are clients 104.

Figure 2:
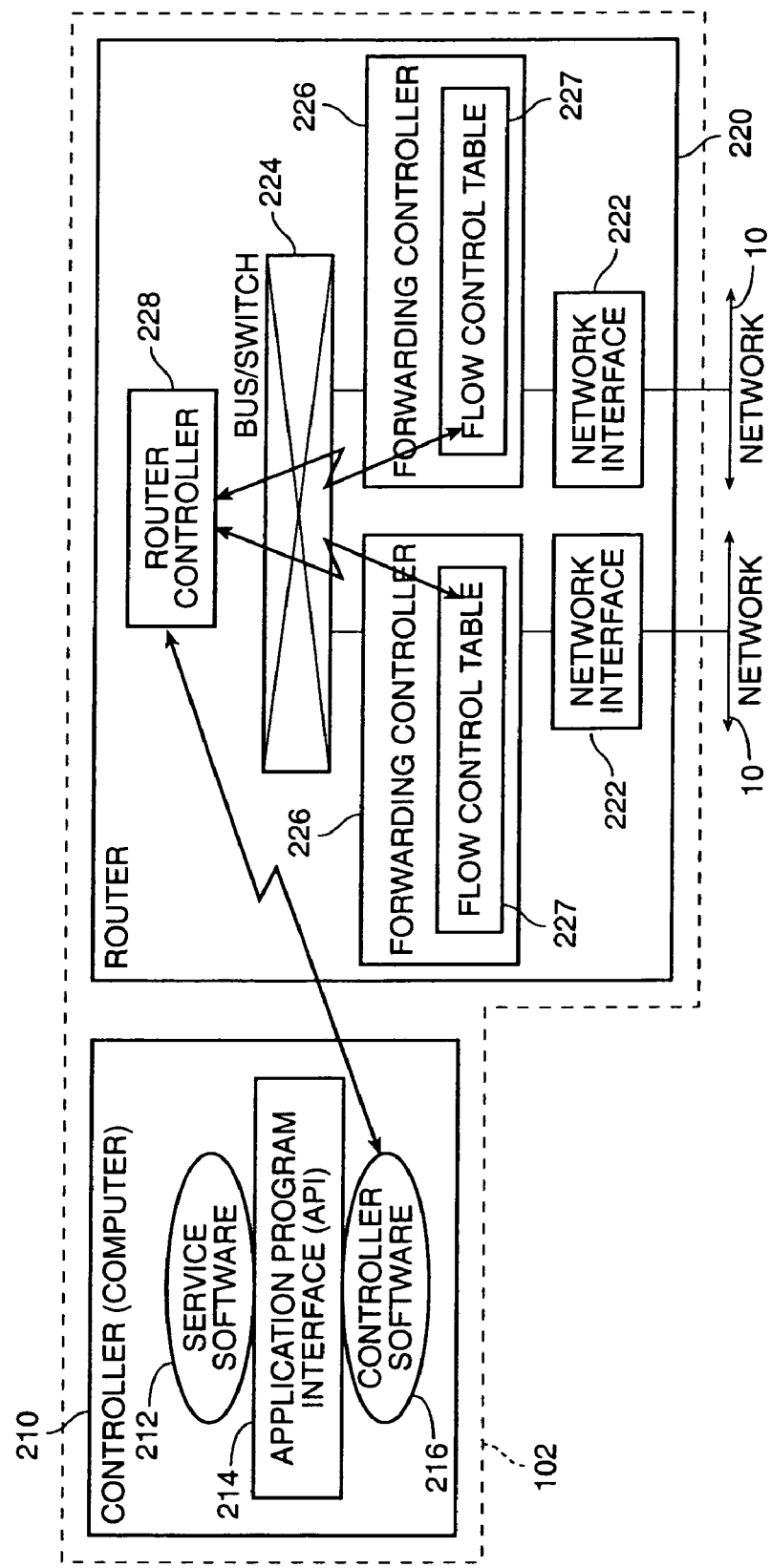
FIG. 2 is a simplified block diagram of a router configured in accordance with the present invention.

FIG. 2 is a simplified system diagram illustrating the typical configuration of a router device 102. The router device includes a controller portion 210 which is typically a computer residing separately from a router portion 220, typically a conventional router. In one configuration, controller portion 210 is located next to router portion 220. The controller 210 can be a PC or a work station coupled to router portion 220 by a network link. In another embodiment, the controller 210 is located remotely. In still another embodiment, a single controller is used to manage one or more router portions 220.

The controller portion 210 includes service software 212 which executes on top of an application program interface (API) 214. The API provides an interface between service software 212 and controller software 216. The controller software communicates directly with router portion 220. In an exemplary embodiment of the invention, the service software provides network services in accordance with the MQLVS model for delivering video content.

The router portion 220 includes one or more network interface circuits 222 (e.g., Ethernet interfaces) coupled to the network 10. Data packets are received and transmitted over the networks by the network interface circuits. The network interface circuits 222 are coupled to an internal bus or switch 224 by way of forwarding controllers 226. Each forwarding controller 226 includes a forwarding control table 227.

A router typically comprises multiple output queues for a single physical port. Each queue can be set with different quality of service attributes, collectively referred to as QoS parameters. For example, each queue can have a different precedence for sending a data packet placed in the queue. Each queue can also have a different packet discard level. The forwarding control tables 227 contain information (the QoS parameters) which establish the QoS settings of each output queue for the transmission of incoming data packets. A router control 228 maintains the forwarding control tables 227.

With respect to FIGS. 1 and 2, a commonly used video platform for transmission over the network is the standard defined by the Motion Picture Experts Group (MPEG). In an MPEG data stream, the video data can be blocked in a data unit comprising an I-frame data packet, followed by groups of B-frame data packets. Each group of B-frame data packets has an associated P-frame data packet which, among other things, serves to separate one group of B-frames from the next. Decoding of a P-frame requires information contained in the I-frame. Decoding of a B-frame uses information contained in both the I-frame and its corresponding P-frame.

Each client 104 can decide on a particular level of video quality. A higher quality video consumes more bandwidth. Consequently, the client who requires or prefers high quality video can be charged a premium for the increased level of service. Most consumers are satisfied with a normal, but lower quality video and thus would be charged less for the service. The varying bandwidth requirements are shown in FIG. 1 by the differently sized data flow arrows. It is possible that a change in quality may need to be effectuated for all clients as a result of adverse network traffic conditions.

This service-changing capability is realized by selective packet transmission processing contained in each of the router devices 102. The content of the packets is recognized as being I-frame data, P-frame data, or B-frame data. In addition, there is logic to detect the low or high frequency element of the layered coding in the data packets. Depending on the desired quality of the video to be delivered to any one client 104, the flow control table 227 can be set to discard all the packets not needed to attain the desired quality level. Consequently, only those packets needed to achieve the desired quality will be forwarded.

In prior art systems, the quality level is set in the router prior to transmitting the video. If the quality level is changed during the transmission, the router will alter its packet selection processing accordingly. However, this means that certain packets may suddenly no longer be transmitted to some clients, or conversely some clients will begin receiving packets unexpectedly. In the case of MPEG data packets, for example, this could mean that a client might not receive a P-frame packet. As a consequence, the client would not be able to correctly decode a subsequently received B-frame packet. To avoid this situation, conventional routers change settings only at the beginning of data unit, namely, when the router receives an I-frame packet.

Figure 3:
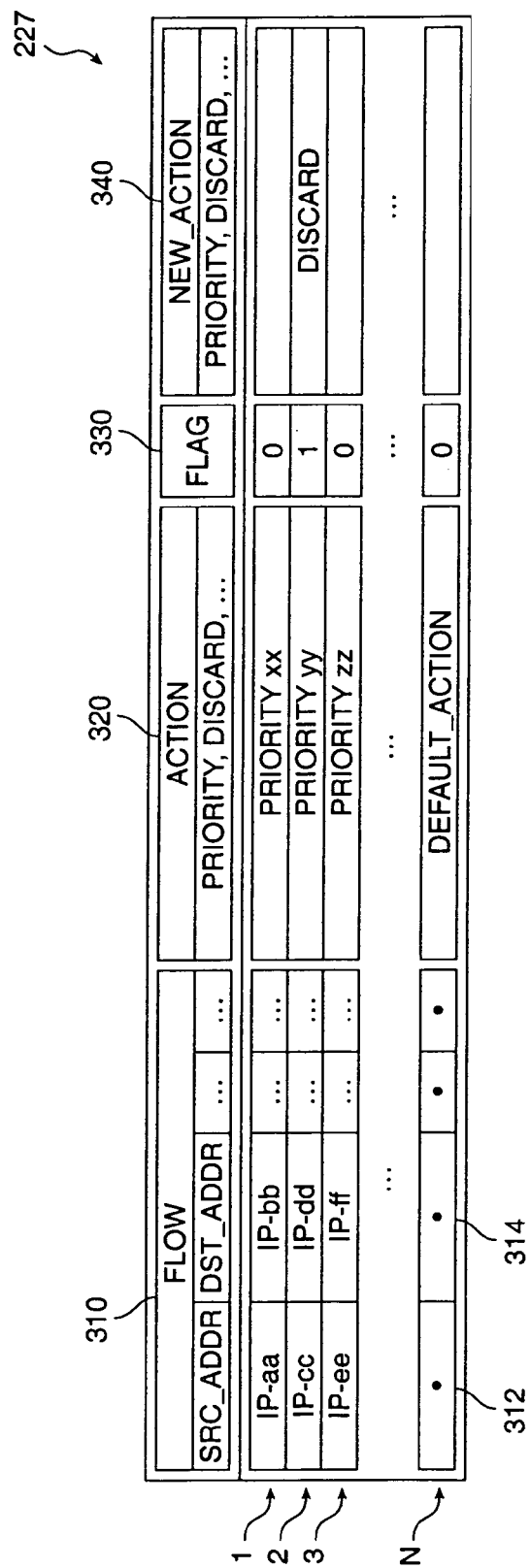
FIG. 3 illustrates a flow control table in accordance with one embodiment of the invention.
Figure 4:
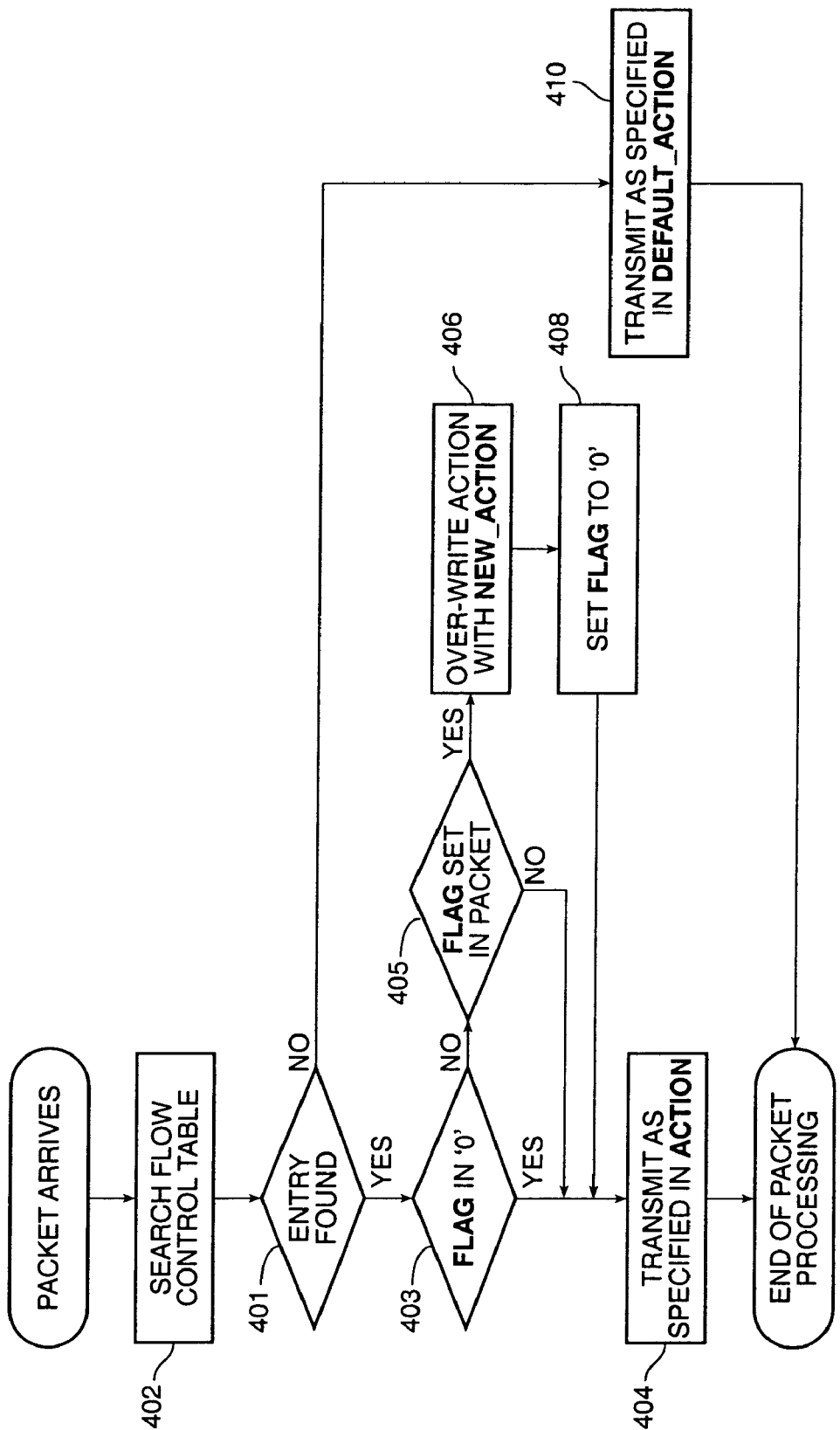
FIG. 4 outlines some of the processing which takes place in a forwarding controller in accordance with an embodiment of the invention.

Referring to FIGS. 2–4, packet handling in a router 102 in accordance with a first embodiment of the invention is shown. FIG. 3 illustrates an embodiment of a flow control table 227. The flow control table includes entries 1, 2, 3, . . . N. Each entry comprises a FLOW field 310, an ACTION field 320, a FLAG field 330, and a NEW_ACTION field 340. The FLOW field 310 further comprises a source address sub-field 312 and a corresponding destination address sub-field 314. Typically, a flow can be identified by

{SRC_ADDR, DST_ADDR, SRC_PORT, DST_PORT, PROTOCOL}.

The ports are software entities assigned by the protocol (e.g., TCP/IP, UDP/IP, etc.), used to differentiate multiple flows between the same couple of computers (server & client). The FLOW field is matched against the information contained in the header field of an incoming packet, identifying which flow the incoming packet belongs to. The ACTION and NEW_ACTION fields contain QoS parameters which determine the output QoS for an outgoing data packet, as will be explained below.

Consider, for example, the case of MQLVS (or DiffServ). The mapping between TOS value (or DSCP value) and the output queue are examples of QoS parameters. In this case, the QoS parameters would be a list of pair of values, TOS and Queue ID:

{{TOS=1, QueueID=4}, {TOS=2, QueueID=2}, . . . }.

In another embodiment, the TOS (or DSCP) value can be added in FLOW field 310. In this case, the QoS parameter would be just the Queue ID. For both cases, it is assumed that the output queues are pre-configured with certain priority/discard settings, and assigning a particular packet to a queue means directly giving a particular (pre-determined) QoS to the packet.

FIG. 4 outlines the processing of a forwarding controller 226. Processing begins by the arrival of a data packet over network 10. The network interface 222 receives the packet and delivers it to forwarding controller 226. The forwarding controller inspects the header of the data packet to find a matching entry in flow control table 227, step 402. It is contemplated that a "key" can be embedded in the payload, and a search be done against this information. In this case, the FLOW field would not simply contain information about a "flow" from point A to B, but rather information based on the content/semantics of the data itself. Continuing, step 402 matches the source address contained in the received data packet against the source address sub-field 312 of the FLOW field 310 of each entry in the flow control table, and matching a destination address also contained the received data packet against the destination address sub-field 314 of the FLOW field 310 in each entry of the flow control table. Incidentally, additional subfields in Flow field 310 would similarly be matched.

Thus, the FLOW field is used as a "key" to match information contained in the header field of the incoming packet. That is to say, for each incoming packet, a search through the flow control table is done, and when matching entry is found in the FLOW field, corresponding ACTION is taken. Furthermore, a wildcard specification may be possible. For example, an entry "xx.yy.zz.*" in SRC_ADDR can match IP address "xx.yy.zz.1", "xx.yy.zz.3", and so on. The wildcard itself may be realized by introducing "mask" fields. For instance, SRC_ADDR_MASK of value "255.255.255.0" would give the same matching result as wildcard format.

Continuing, a test is made to determine if an entry for the received data packet was found, step 401. If no entry was found, then a DEFAULT_ACTION is taken, step 410, in connection with how the data packet is to be forwarded. For example, the default action might simply be to dump the packet, without forwarding it. Processing of the received data packet is then concluded.

A matching entry is found if both the source and destination address sub-fields of its FLOW field 310 matches the source and destination fields contained in the received data packet. If a matching entry is found, processing proceeds to a second test at step 403. Here, the FLAG field 330 of the matching entry is inspected. If the FLAG field 330 is not set (e.g., contains a value of '0'), then processing proceeds to step 404. At step 404, the received data packet is transmitted from the router 102 (i.e. forwarded). The output QoS of the transmitted data packet is determined by the parameters contained in the ACTION field 320 of the matching entry. Processing of the data packet then concludes.

Returning to the test at step 403, if the FLAG field 330 is set (e.g., contains a value other than '0'), then processing proceeds to yet another test at step 405. In accordance with this embodiment of the invention, information contained in a predetermined portion of the data packet is tested. In one embodiment, a specific field (bit) in the IP packet header is used; for example, the UNUSED bits in the TOS field of the IP (v4) header, or the IP OPTIONS field of the IP header. In order to facilitate the test, the predetermined portion of the data packet preferably is a single bit that is either set (e.g., contains a '1') or not set (e.g., contains a '0'). If the predetermined portion is not set, then processing proceeds according to step 404. That is, the data packet is transmitted with an output QoS determined by the QoS parameters contained in the ACTION field 320 of the matching entry. Processing of the packet is then concluded.

If the predetermined portion of the data packet is set, then processing proceeds to step 406. Here, the information contained in the NEW_ACTION field 340 of the matching entry is copied to the ACTION field 320 of that entry. Detecting the presence of the information in the predetermined portion of the data packet triggers the copying of the contents in the NEW_ACTION field to the ACTION field. By so doing, this changes the output QoS of the associated queue for subsequent transmissions through that queue.

Next, the FLAG field 330 of the matching entry is cleared (e.g., set to '0'), step 408. The data packet is then transmitted in step 404, as before, with an output QoS determined by the QoS parameters contained in the ACTION field 320 of the matching entry. However, the parameters contained in the ACTION field now are those obtained from the NEW_ACTION field 340. Thus, the data packet will be transmitted in step 404 with a new QoS setting. Processing of the received data packet is then concluded.

Figure 5:
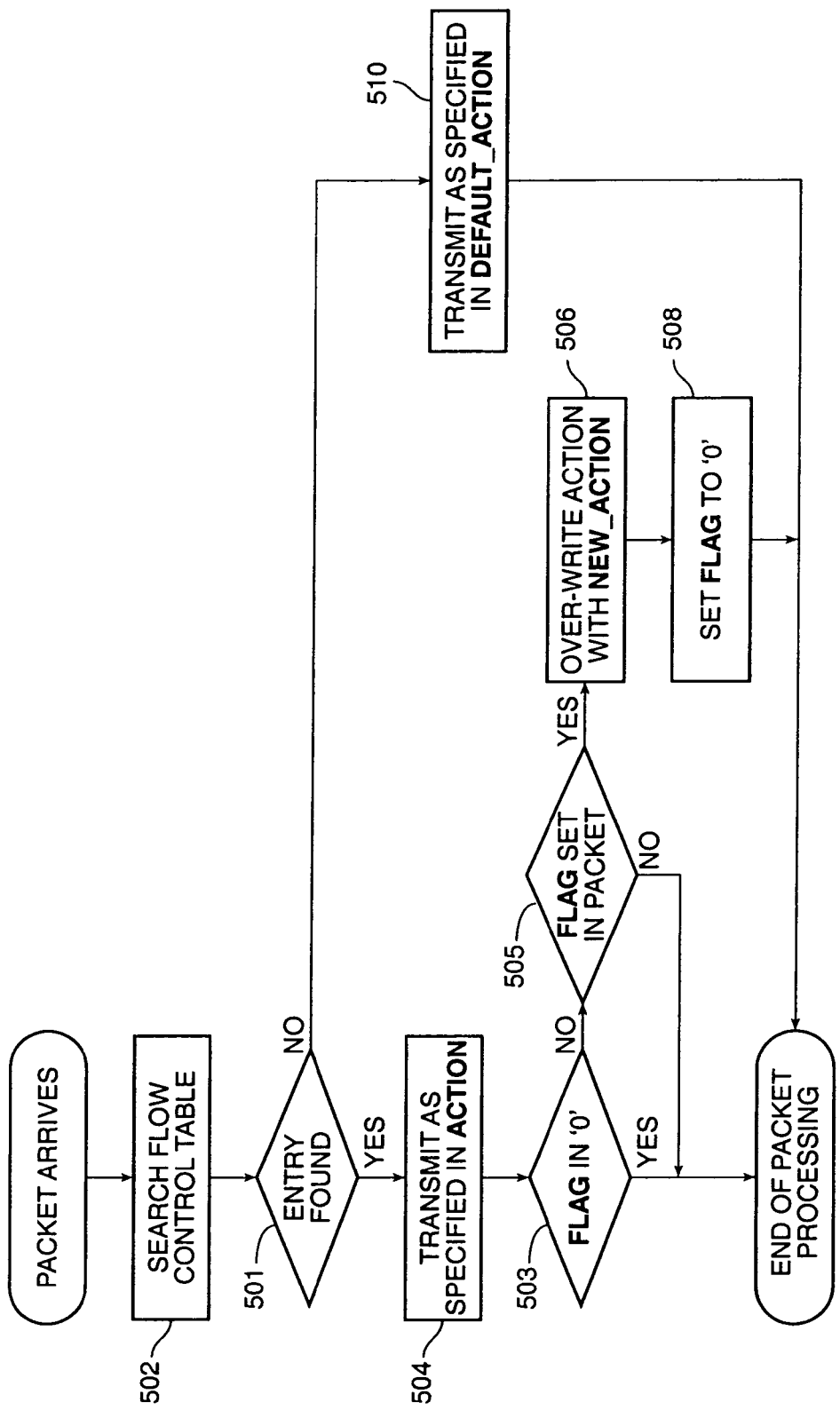
FIG. 5 outlines a variation in the processing of the forwarding controller.

FIG. 5 shows the process flow in the forwarding controller 226 in a variation of the first embodiment of the invention. As in the process flow of FIG. 4, processing begins by the arrival of a data packet over network 10 via network interface 222. The forwarding controller 226 inspects the contents of the data packet to find a matching entry in flow control table 227, step 502. The source address contained in the received data packet is matched against the source address sub-field 312 of the FLOW field 310 of each entry in the flow control table. A destination address also contained the received data packet likewise is matched against the destination address sub-field 314 of the FLOW field 310 in each entry of the flow control table. A test is made to determine if an entry for the received data packet was found, step 501. If no entry was found, then a DEFAULT_ACTION is taken, step 510, in connection with how the data packet is to be forwarded. As before, the default action might simply be to dump the packet, without forwarding it. Processing for the received data packet then concludes.

Returning to the test at step 501, a matching entry is found if both the source and destination address sub-fields of its FLOW field 310 matches the source and destination fields contained in the received data packet. If a matching entry is found, processing proceeds to step 504. Here, the received data packet is transmitted from the router 102. The output QoS of the transmitted data packet is determined by the parameters contained in the ACTION field 320 of the matching entry. Processing then proceeds to a test at step 503. Here, the FLAG field 330 of the matching entry is inspected. If the FLAG field 330 is not set (e.g., contains a value of '0'), then processing of the received packet, which has now been transmitted, concludes.

On the other hand, if the FLAG field 330 is set (e.g., contains a value other than '0'), then processing proceeds to yet another test at step 505. In accordance with this embodiment of the invention, information contained in a predetermined portion of the data packet is tested. For example, in order to facilitate the test, the predetermined portion of the data packet preferably is a single bit that is either set (e.g., contains a '1') or not set (e.g., contains a '0'). If the predetermined portion is not set, then processing of the received data packet, which has now been transmitted, concludes.

If the predetermined portion of the data packet is set, then processing proceeds to step 506. Here, the information contained in the NEW_ACTION field 340 of the matching entry is copied to the ACTION field 320 of that entry. The FLAG field 330 of the matching entry is cleared (e.g., set to '0'), step 508. Detecting the presence of the information in the predetermined portion of the data packet triggers the copying of the contents in the NEW_ACTION field to the ACTION field. Processing of the received data packet, which has now been transmitted, is then concluded.

The merit of the approach outlined in FIG. 5 becomes evident in the case where the router takes some time to effectuate a new QoS setting for a given output queue. If the QoS is reconfigured prior to transmitting the data packet, as is the case outlined in the processing of FIG. 4, the data packet containing the triggering information would be delayed for the time it takes to implement the new QoS setting. However, the delay can be avoided as shown in FIG. 5 by immediately transmitting the received data packet and then making the tests to detect for the presence of a new QoS setting.

In yet another variation of first embodiment of the invention, the data packet containing the triggering information can be delivered as a special data packet, rather than a data packet having an actual payload of video data. In this variation of the first embodiment, the forwarding controller 226 only needs to detect for the reception of the special packet as the triggering event. The parameters normally contained in the NEW_ACTION field would be stored in a memory separate from the flow control table 227.

Referring back to the MQLVS system illustrated in FIG. 1, the video server 100 produces the data packet containing the triggering information. More specifically, video server 100 sets the bit (flag) in the predetermined portion of the first data packet comprising a data unit, namely, the data packet carrying the I-frame data. This is easily implemented in software, in firmware, or in logic circuitry which handles the packetizing of the video data for transmission. It is understood that for other data server applications, other appropriate logic, firmware, or software would be used to determine when and how the triggering information would be provided.

Turning now to FIG. 6, an API used to set the flow control table in accordance with the first embodiment of the invention is illustrated by way of the exemplary C-language code fragment. The function call Set_QoS( ) takes three arguments: a FLOW data structure; an ACTION data structure; and a FLAG data type. The FLOW data structure specifies source and destination addresses for the data packet that will contain the triggering information. The ACTION data structure contains among other things the parameters for a QoS setting of the output queue in the router associated with the destination address contained in the FLOW data structure. The FLAG data type specifies whether to immediately put into effect the QoS setting, or to delay the QoS setting.

Returning to FIGS. 1 and 2, when the video server decides that a change in QoS is appropriate, it communicates with the service software 212 in the controller portion 210 of router 102. The server transmits new QoS information to the flow control table by way of the service software 212 to the API 214.

In one embodiment, the service software 212 could be a program written by a mobile code, such as Java, and sent by the video server at the beginning of service. In this case, the service software and the video server can retain a communication path (e.g., TCP/IP, UDP/IP, etc.) over the network connection. In another embodiment, which would be a "cleaner" approach, is to build the whole system on a distributed computing environment. One example of such an environment is CORBA (Common Object Request Broker Architecture). In this case, the objects consisting the service software and (part of) the video server can communicate via a mechanism called IIOP (Internet Inter-ORB Protocol; ORB: Object Request Broker), based on TCP/IP and physically can go over any network connection (e.g., LAN, WAN, etc.).

The service software uses this information for the API function call Set_Qos( ). More particularly, the information specifies the target_flow argument, the new_action argument, and the flag argument. Set_Qos( ) looks for a matching entry in the flow table that matches the information contained in the target_flow argument. If the flag argument is CHANGE_IMMEDIATE, then the new_action argument is written to the ACTION field 320 of the matching entry. If the flag argument is CHANGE_SYNCHRONOUS, then the NEW_ACTION field in the entry is filled with information from the new_action argument, and the corresponding FLAG field 330 is set.

As an alternative to communicating the new QoS information by way of the service software 212, special data packets can be defined which contain the same information. In this case, the forwarding controller 226 would detect the special packets. The forwarding controller would contain logic or code to extract the information from the special packets and feed them directly to the appropriate fields in the flow control table 227. A special packet can be defined by assigning a predetermined location in the packet to contain a one-bit "flag". The flag can be used to show that the packet is a special data packet with the new QoS information.

Figure 7:
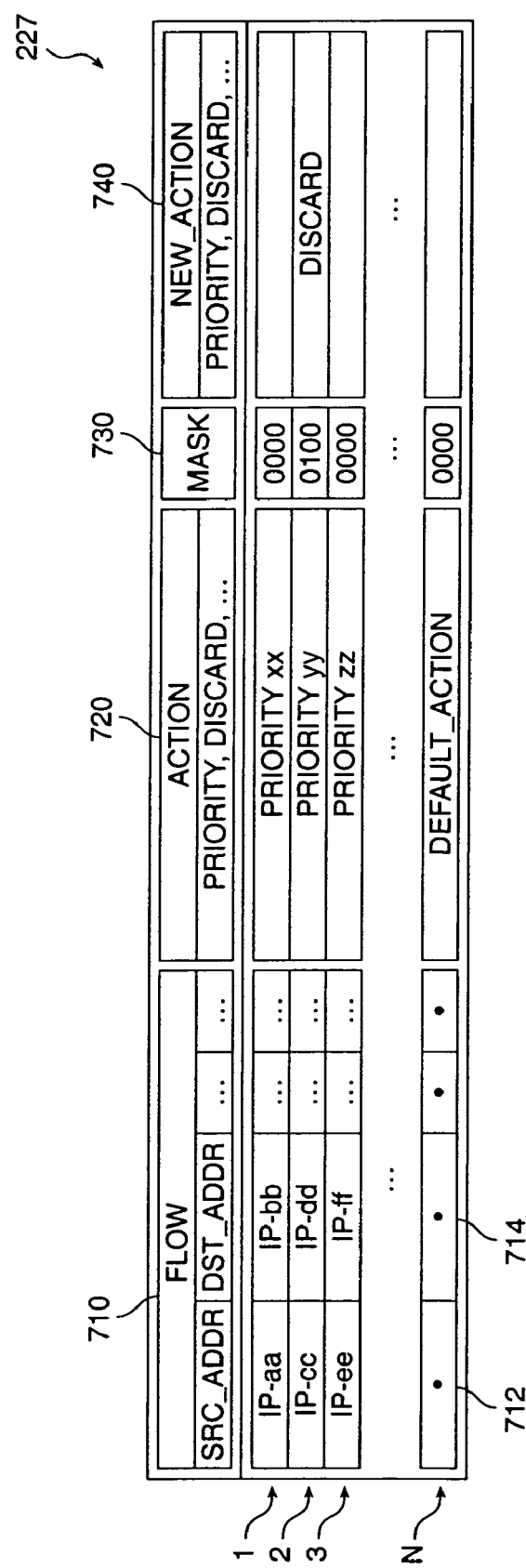
FIG. 7 illustrates a flow control table in accordance with another embodiment of the invention.
Figure 8:
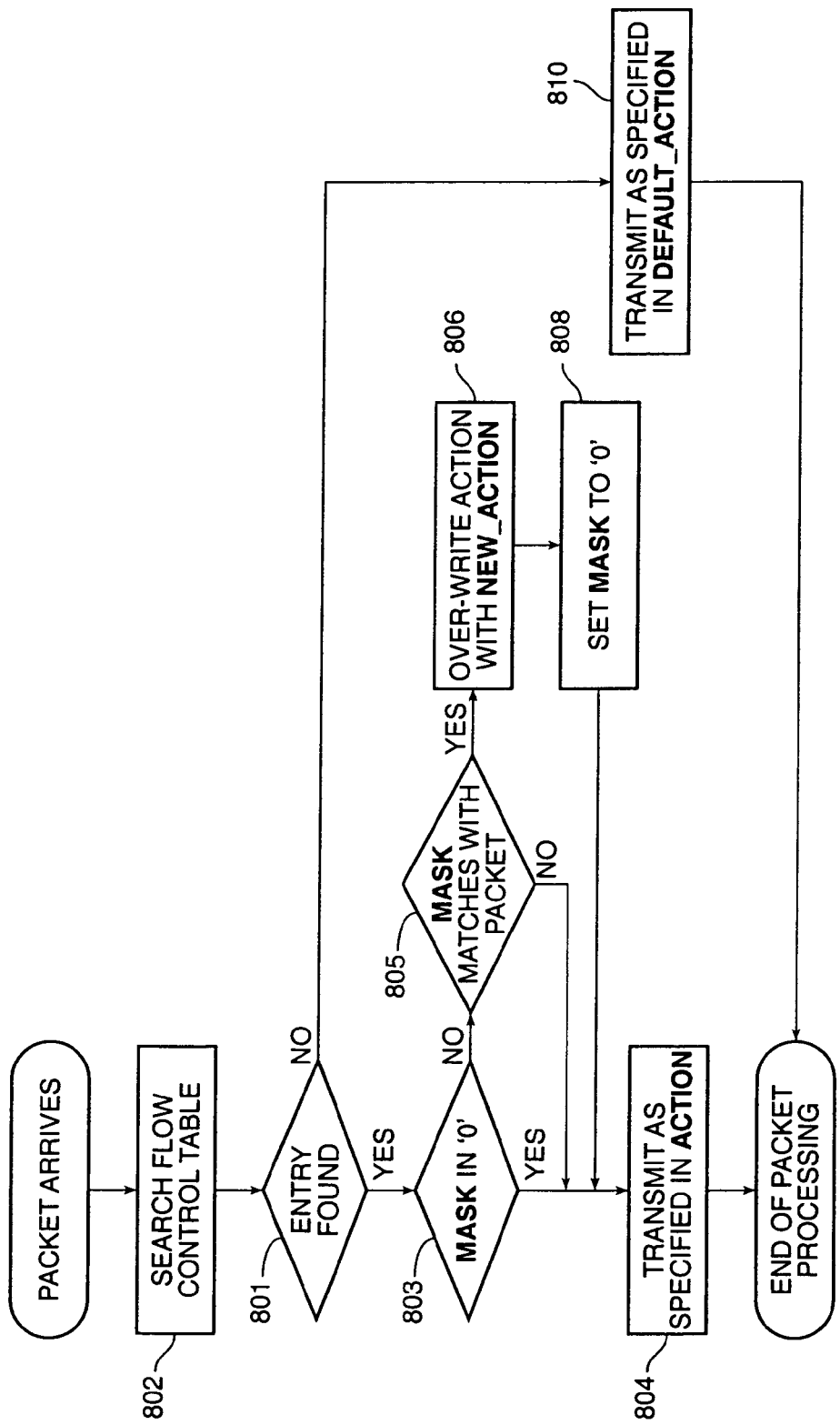
FIG. 8 outlines some of the processing which takes place in a forwarding controller in accordance with another embodiment of the invention.

Referring to FIGS. 2, 7, and 8, packet handling in a router 102 in accordance with a second embodiment of the invention is shown. FIG. 7 illustrates another embodiment of flow control table 227, having fields similar to the flow control table illustrated in FIG. 3. The flow control table shown in FIG. 7 includes entries 1, 2, 3, . . . N. Each entry comprises a FLOW field 710, an ACTION field 720, a MASK field 730, and a NEW_ACTION field 740. The FLOW field 710 further comprises a source address sub-field 712 and a corresponding destination address sub-field 714. The ACTION and NEW_ACTION fields contain QoS parameters which determine the output QoS for an outgoing data packet, as will be explained below. The MASK field is a bit pattern.

FIG. 8 outlines the processing of forwarding controller 226. Processing begins by the arrival of a data packet over network 10 via network interface 222. The forwarding controller inspects the contents of the data packet to find a matching entry in flow control table 227, step 802. This is done by matching a source address contained in the received data packet against the source address sub-field 712 of the FLOW field 710 of each entry in the flow control table, and matching a destination address also contained in the received data packet against the destination address sub-field 714 of the FLOW field 710 in each entry of the flow control table. A test is made to determine if an entry for the received data packet was found, step 801. If no entry was found, then a DEFAULT_ACTION is taken, step 810, in connection with how the data packet is to be handled. For example, the default action might simply be to dump the packet, without forwarding it. Processing of the received data packet is then concluded.

A matching entry is found if both the source and destination address sub-fields of its FLOW field 710 matches the source and destination fields contained in the received data packet. If a matching entry is found, processing proceeds to a second test at step 803. Here, the MASK field 730 of the matching entry in the flow control table 227 is tested. If the mask value in the MASK field 730 is all zeroes, then processing proceeds to step 804. At step 804, the received data packet is transmitted from the router 102. The output QoS of the transmitted data packet is determined by the parameters contained in the ACTION field 720 of the matching entry. Processing of the packet is then concluded.

Returning to the test at step 803, if the value contained in the MASK field 730 is not all zeroes, then processing proceeds to yet another test at step 805. In accordance with this embodiment of the invention, the MASK field is compared to a predetermined portion of the data packet containing a similar sized mask field. In the case of the MQLVS system exemplified in FIG. 1, the predetermined field can be the type of service (TOS) field in the IP header of the data packet. If the MASK does not match the predetermined portion of the data packet, then processing proceeds according to step 804. At step 804, the data packet is transmitted with an output QoS determined by the QoS parameters contained in the ACTION field 720 of the matching entry which concludes processing of the data packet.

If the predetermined portion of the data packet matches the MASK field 730, then processing proceeds to step 806. Here, the information contained in the NEW_ACTION field 740 of the matching entry is copied to the ACTION field 720 of that entry. Detecting the presence of the information in the predetermined portion of the data packet triggers the copying of the contents in the NEW_ACTION field to the ACTION field.

Next, the MASK field 730 of the matching entry is cleared (i.e., set to all zeroes), step 808. The data packet is then transmitted, step 804, with an output QoS determined by the QoS parameters contained in the ACTION field 720 of the matching entry. However, the parameters contained in the ACTION field are those obtained from the NEW_ACTION field 740. Thus, the data packet will be transmitted in step 804 with a new QoS setting. Processing of the received data packet is then concluded.

Figure 9:
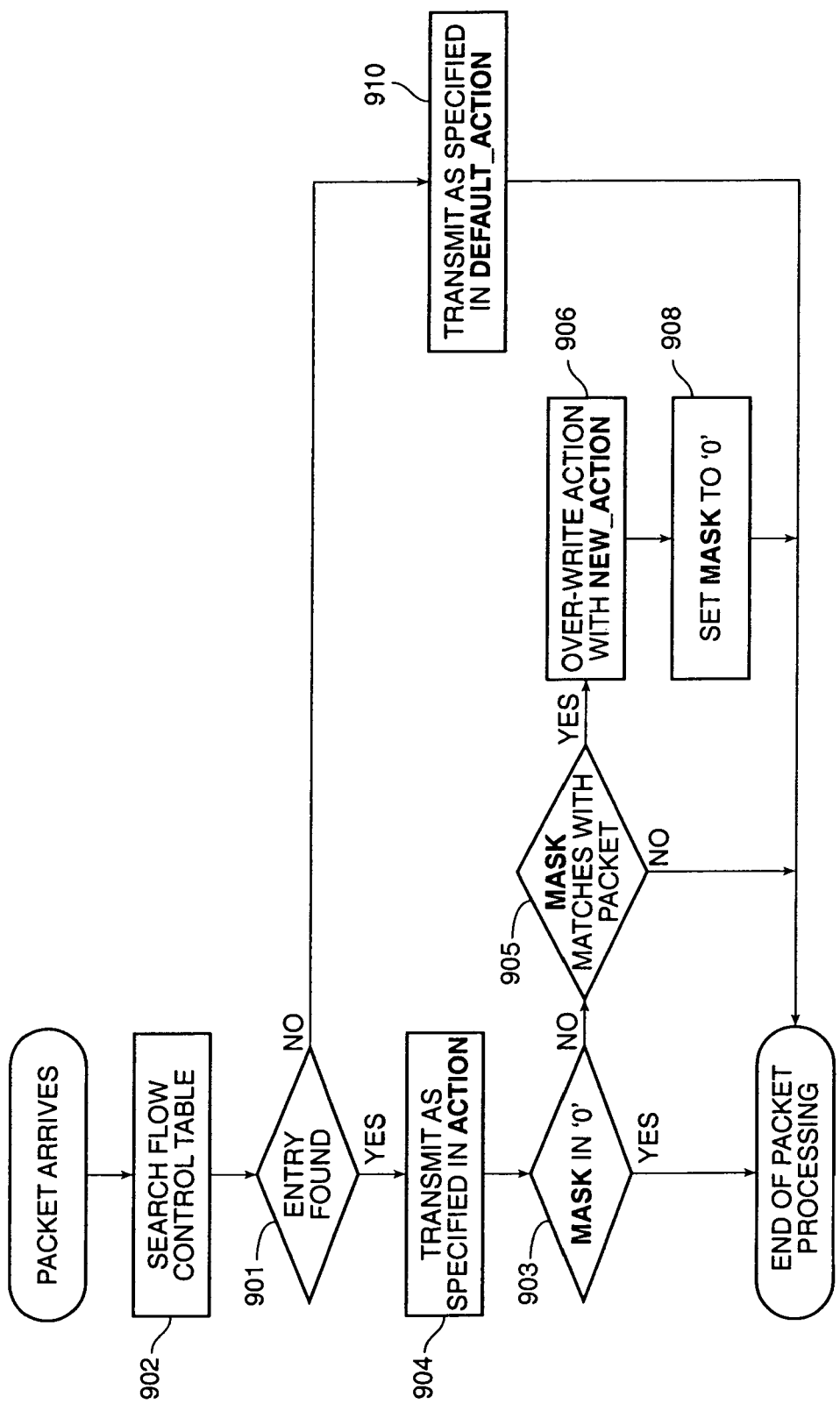
FIG. 9 outlines a variation in the processing of the forwarding controller.

FIG. 9 shows the process flow in the forwarding controller 226 in accordance with a variation of the second embodiment of the invention. As in the process flow of FIG. 8, processing begins by the arrival of a data packet over network 10 via network interface 222. The forwarding controller inspects the contents of the data packet to find a matching entry in flow control table 227, step 902. The source address contained in the received data packet is matched against the source address sub-field 712 of the FLOW field 710 of each entry in the flow control table. A destination address also contained the received data packet likewise is matched against the destination address sub-field 714 of the FLOW field 710 in each entry of the flow control table. A test is made to determine if an entry for the received data packet was found, step 901. If no entry was found, then a DEFAULT_ACTION is taken, step 910, in connection with how the data packet is to be handled. For example, the default action might simply be to dump the packet, without forwarding it. Processing for the received data packet then concludes.

Returning to the test at step 901, a matching entry is found if both the source and destination address sub-fields of its FLOW field 710 matches the source and destination fields contained in the received data packet. If a matching entry is found, processing proceeds to step 904. Here, the received data packet is transmitted from the router 102. The output QoS of the transmitted data packet is determined by the parameters contained in the ACTION field 720 of the matching entry.

Processing then proceeds to a test at step 903. Here, the MASK field 730 of the matching entry is inspected. If MASK field 730 is all zeroes, then processing of the received packet, which has now been transmitted, concludes.

On the other hand, if MASK field 730 is not all zeroes, then processing proceeds to yet another test at step 905. In accordance with this embodiment of the invention, the MASK is compared to the predetermined portion of the data packet. If the predetermined portion does not match the MASK, then processing of the received data packet, which has now been transmitted, concludes.

If the predetermined portion of the data packet matches, then processing proceeds to step 906. Here, the information contained in the NEW_ACTION field 740 of the matching entry is copied to the ACTION field 720 of that entry. The MASK field 730 of the matching entry is set to all zeroes, step 908. Detecting a match with the predetermined portion of the data packet triggers the copying of the contents in the NEW_ACTION field to the ACTION field. Processing of the received data packet, which has now been transmitted, is then concluded.

The merit of the approach outlined in FIG. 9 becomes evident in the case where the router takes some time to effectuate a new QoS setting for a given output queue. If the QoS is reconfigured prior to transmitting the data packet, as is the case outlined in the processing of FIG. 8, the data packet which triggers the copying would be delayed for the time it takes to implement the new QoS setting. However, the delay can be avoided as shown in FIG. 9 by immediately transmitting the received data packet and then effectuating a new QoS setting.

Turning now to FIG. 10, an API used to set the flow control table in accordance with the second embodiment of the invention is illustrated by way of the exemplary C-language code fragment. The function call Set_QoS( ) takes three arguments: a FLOW data structure; an ACTION data structure; and a MASK argument. The FLOW data structure specifies source and destination addresses for the data packet that will contain the triggering information. The ACTION data structure contains among other things the parameters for a QoS setting of the output queue in the router associated with the destination address contained in the FLOW data structure. The MASK is an 8-bit bit pattern.

With reference to FIGS. 1 and 2, when the video server decides that a change in QoS is appropriate, it communicates with the service software 212 in the controller portion 210 of router 102. The video server transmits new QoS information to the flow control table by way of the API. The service software 212 uses this information for the API function call Set_Qos( ). More particularly, the information specifies the target_flow argument, the new_action argument, and the mask argument. Set_Qos( ) looks for a matching entry in the flow table that matches the information contained in the mask argument. The NEW_ACTION field 740 of the matching entry is filled with information from the new_action argument, and the value of the mask argument is copied to the corresponding MASK field 730 of the matching entry.

As an alternative to communicating the new QoS information by way of the service software 212, special data packets can be defined which contain the same information. In this case, the forwarding controller 226 would detect the special packets. Logic or software or the like contained in the forwarding controller would extract the information from the packets and deliver it directly to the appropriate fields in the flow control table 227.

FIG. 11 shows a variation of the API used to set the flow control table of FIG. 7. This variation of the API is quite general, allowing the location of the predetermined portion of the incoming data packet to be defined anywhere within the data packet, in addition to specifying the mask value. The predetermined portion can be in the packet header or in the payload itself, at a specified location with a specified length.

The function call Set_QoS( ) takes three arguments: a FLOW data structure; an ACTION data structure; and a MASK data structure. The FLOW data structure and ACTION data structures are as previously defined. The MASK data structure can accommodate header and payload specifications. If the predetermined portion is to be located in the header, then the relevant data structure is the HEADER_FIELD. This data structure specifies which field in the header of the data packet that the mask value will be compared against. If the predetermined portion is to be located in the payload, then the relevant data structure is the PAYLOAD_FIELD. This data structure specifies by offset_position where, from the beginning of the payload, the predetermined portion begins. A field_length specifies the length of the field to be compared against the mask value. Whether a HEADER_FIELD or a PAYLOAD_FIELD is specified, there is a field_value which specifies the mask value to be stored in the flow control table.

Yet another variation of the API for setting the flow control table of FIG. 7 is illustrated in FIG. 12. Here, multiple invocations of Set_QoS( ) can be made. The mask value to the invocations can be set by a single function call to Commit_Change( ). Each entry affected by a Set_QoS( ) call would receive the mask value.

Figure 13:
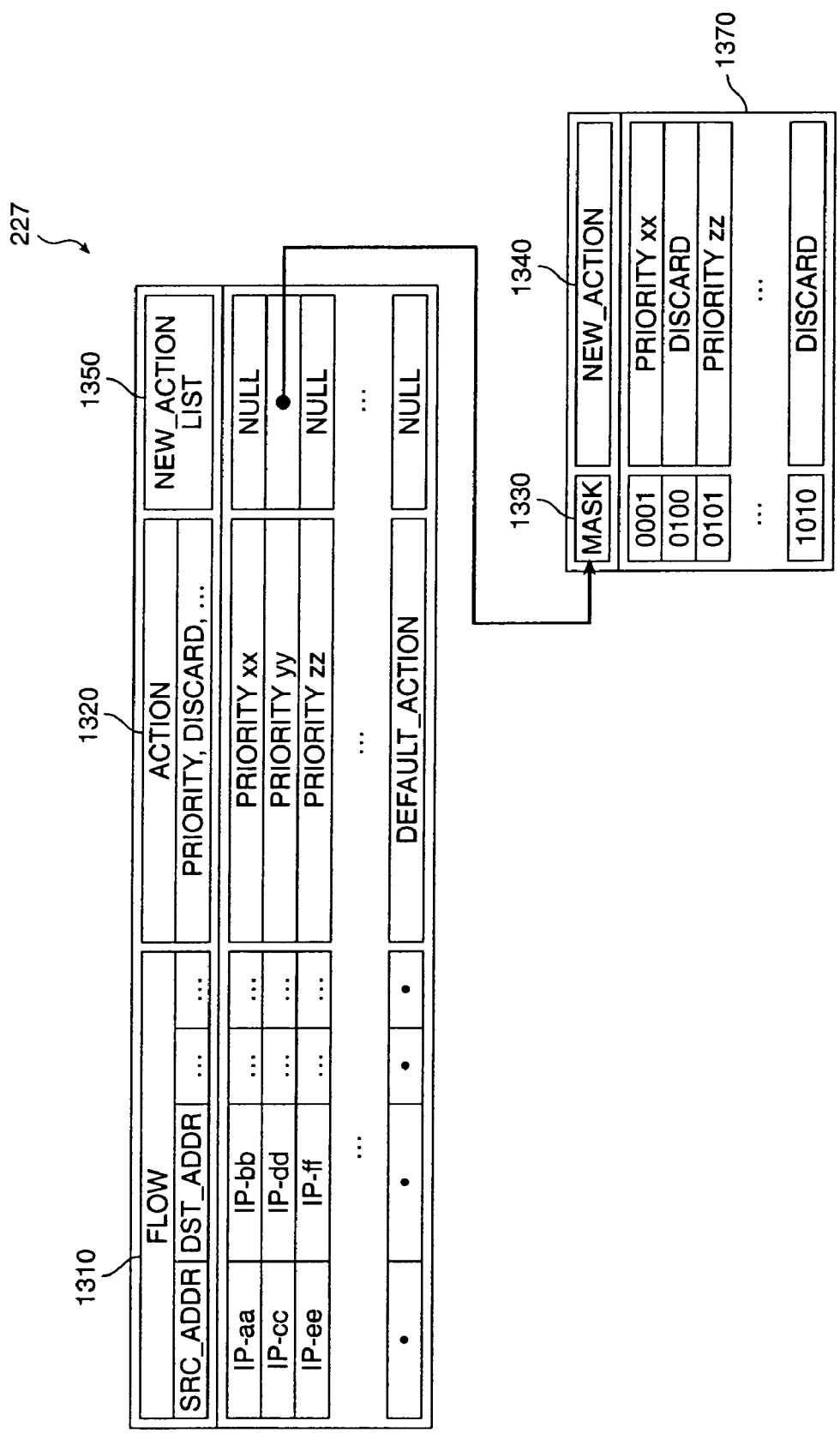
FIG. 13 illustrates yet another embodiment of the flow control table.

FIG. 13 shows yet a third embodiment of the invention wherein the flow control table 227 incorporates a vector of plural entries of QoS parameters. In addition to the FLOW field 1310 and the ACTION field 1320, a NEW_ACTION_LIST field 1350 is provided. The NEW_ACTION_LIST field 1350 is a pointer to an array of QoS settings 1370. Each entry in the array comprises a MASK field 1330, and a NEW_ACTION field 1340 containing the QoS parameters. Thus, for a given entry in the flow control table 227, there can be a multitude of QoS settings for the corresponding output queue. The particular QoS level chosen depends on the which MASK field 1330 matches the bit pattern contained in the predetermined location of the received data packet.

The API for setting this variation of the flow control table can be readily obtained by making appropriate modifications to the embodiments of API's illustrated in FIGS. 10–12. The MASK and ACTION data structures would be altered to be lists instead of single element structures.

In a variation of the flow control table of FIG. 13, the NEW_ACTION_LIST can have a persistent mode. In the earlier described embodiments, the MASK field is cleared upon changing the QoS setting. For example, step 808 in FIG. 8 is a step of clearing the MASK field. With a persistent mode of operation, the MASK field remains unaffected until it is explicitly deleted. This can be implemented by providing an appropriate API.

Figure 14:
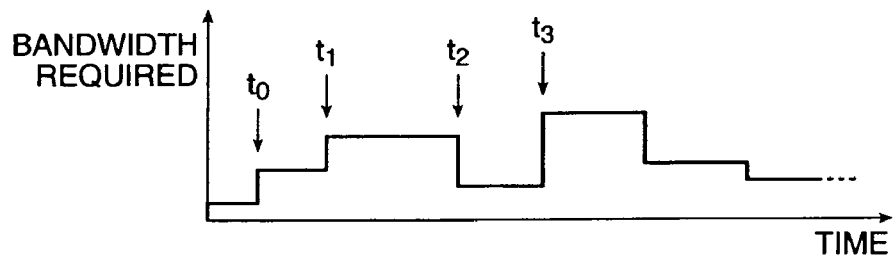
FIG. 14 shows a typical bandwidth pattern in a video stream.
Figure 15:
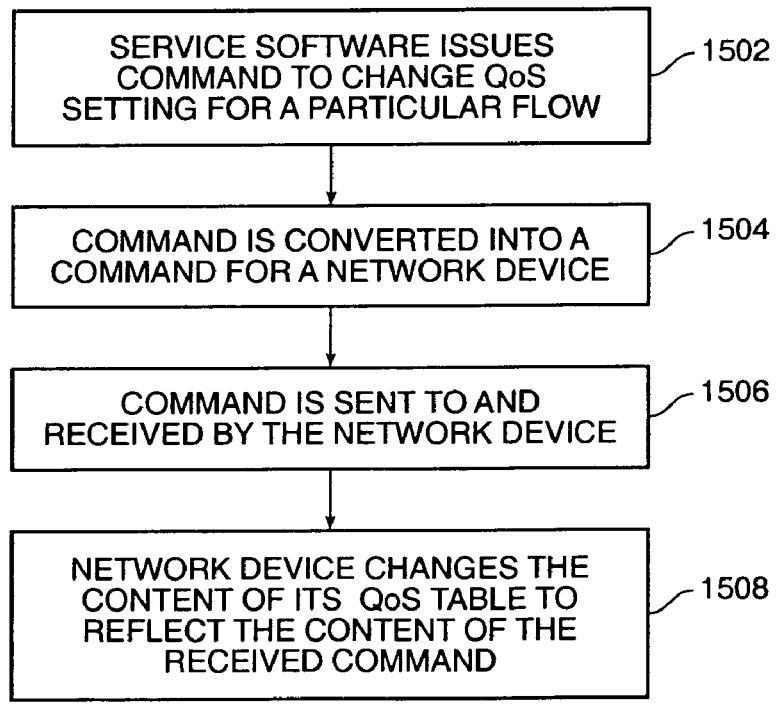
FIG. 15 illustrates a typical prior art maintenance sequence.

Providing for a persistent mode feature in the flow control table of FIG. 13 would be useful for traffic flow situations where the pattern of bandwidth requirements is known. For example, in the case of a video stream, the bandwidth requirements for different scenes in the video vary. Thus, it is possible to vary the bandwidth requirements of the network as a function of the video content. In addition, this information can be determined a priori for the entire video stream. FIG. 14, for example, shows a typical sequence where the bandwidth requirement changes over time.

The video server 100 can program the flow control table of FIG. 13 with the QoS parameters comprising the list of QoS settings in array 1370 by an appropriate API. Alternatively, an appropriate protocol can be defined to provide a list of QoS parameters by way of special data packets.

During a video transmission, the video server sets mask values in the appropriate video data packets to select the QoS in the router 102 according to the bandwidth required for the different scenes in the video transmission. For example, the first packet of each scene would provided with a mask value to select the QoS needed for that scene. Upon receiving this packet, the router will set the output QoS accordingly. When the video scene changes, the first packet in the next scene will have a different mask value, one that will select an appropriate QoS in the router. By adjusting the flow control table dynamically in this way, the usage of the router resources can be made efficient. Resources would be released when the bandwidth requirement of the video is lessened, and vice-versa, thus minimizing the consumption of resources.

The API shown in FIG. 6 can also be used in a similar manner. Each time a scene change is about to occur, the video server can invoke the API using the CHANGE_IMMEDIATE flag.

It is understood that the forgoing discussion can be readily extended to include network devices other than router devices. Typically, the service provider dos not have its own router. Routers and switches are maintained by the network providers. Furthermore, from a server to any client, the communication path may traverse multiple network domains. The present invention can be readily adapted by persons of ordinary skill in the art to switching devices and in general to network devices along the communication path between the server and the client. For example, the QoS settings in two or more network devices along the communication path from the server to the client can be adjusted in accordance with the invention. Device addressing information can be readily incorporated to identify the network device(s) of interest, so that subsequent QoS parameters can be communicated thereto. Multicast transmissions can be used in cases where multiple network devices can share the same QoS parameters.

As noted above, the video server disclosed herein is simply an example by which the inventive features and aspects of the present invention can be presented. The invention is applicable to data servers in general and should not be construed as being limited to video servers.

The present invention enables the data service provider to design new services based on finer control of the data transmission resources. For example, in the MQLVS system illustrated in FIG. 1, instead of limiting the service changes solely on the basis of the first packet of an MPEG data unit, the service provider can control the service changes in terms of time clicks, on the basis of the video content as the video scene changes, as traffic conditions vary, and so on. Service can be incorporated with the accounting and/or billing policies of the provider, where customers at the client end pay the provider depending on the quality of services that they desire. The invention can be utilized to increase effective usage of network resources.

What is claimed is:

1. In a data delivery system having a data server in data communication with plural network devices, a method of changing a current network device attribute of a target network device, said method comprising steps of:
    transmitting first information from said data server to said target network device, said first information comprising at least one new network device attribute;
    storing said at least one new network device attribute in said target network device;
    transmitting second information from said data server to said target network device including incorporating said second information in a data packet destined for a client;
    in response to receiving said second information, changing said current network device attribute of said target network device in accordance with said at least one new network device attribute; and
    forwarding said data packet by transmitting it from said target network device;
    wherein changing said current network device attribute is performed prior to said forwarding.

2. The method claim 1 wherein said at least one network device attribute includes a QoS setting.

3. The method of claim 1 wherein said first information includes an address of said target network device.

4. In a data delivery system having a data server in data communication with plural network devices, a method of changing a current network device attribute of a target network device, said method comprising steps of:
    transmitting first information from said data server to said target network device, said first information comprising at least one new network device attribute;
    storing said at least one new network device attribute in said target network device;
    transmitting second information from said data server to said target network device including incorporating said second information in a data packet destined for a client;
    in response to receiving said second information, changing said current network device attribute of said target network device in accordance with said at least one new network device attribute; and
    forwarding said data packet by transmitting it from said target network device, wherein said step of changing said current network device attribute is performed subsequent to said step of forwarding.

5. In a data delivery system having a data server in data communication with plural network devices, a method of changing a current network device attribute of a target network device, said method comprising steps of:
    transmitting first information from said data server to said target network device, said first information comprising at least one new network device attribute;
    storing said at least one new network device attribute in said target network device;
    transmitting second information from said data server to said target network device; and
    in response to receiving said second information, changing said current network device attribute of said target network device in accordance with said at least one new network device attribute;
    wherein said step of transmitting said second information includes incorporating said second information in a data packet that is not destined for a client.

6. The method of claim 1 wherein said step of transmitting said first information includes incorporation said first information in a data packet destined for a client.

7. The method of claim 1 wherein said step of transmitting said first information includes incorporating said first information in a data packet that is not destined for a client.

8. In a data delivery system having a data server in data communication with plural network devices, a method of changing a quality of service (QoS) of a target network device, said method comprising steps of:
    transmitting first information from said data server to said target network device, said first information representing a new QoS and comprising at least one QoS parameter;
    storing said at least one QoS parameter in said target network device;
    transmitting second information from said data server to said target network device including incorporating said second information in a data packet destined for a client;
    in response to receiving said second information, changing said QoS of said target network device in accordance with said stored QoS parameter, thereby putting into effect said new QoS; and
    forwarding said data packet by transmitting it from said target network device, wherein said step of changing said QoS is performed prior to said step of forwarding.

9. The method of claim 8 wherein said first information includes an address of said target network device.

10. In a data delivery system having a data server in data communication with plural network devices, a method of changing a quality of service (QoS) of a target network device, said method comprising steps of:
    transmitting first information from said data server to said target network device, said first information representing a new QoS and comprising at least one QoS parameter;
    storing said at least one QoS parameter in said target network device;
    transmitting second information from said data server to said target network device including incorporating said second information in a data packet destined for a client;
    in response to receiving said second information, changing said QoS of said target network device in accordance with said stored QoS parameter, thereby putting into effect said new QoS; and
    forwarding said data packet by transmitting it from said target network device, wherein said step of changing said QoS is performed subsequent to said step of forwarding.

11. In a data delivery system having a data server in data communication with plural network devices, a method of changing a quality of service (QoS) of a target network device, said method comprising steps of:

transmitting first information from said data server to said target network device, said first information representing a new QoS and comprising at least one QoS parameter;

storing said at least one QoS parameter in said target network device;

transmitting second information from said data server to said target network device; and in response to receiving said second information, changing said QoS of said target network device in accordance with said stored QoS parameter, thereby putting into effect said new QoS;

wherein said step of transmitting said second information includes incorporating said second information in a data packet that is not destined for a client.

12. The method of claim 8 wherein said step of transmitting said first information includes incorporating said first information in a data packet destined for a client.

13. The method of claim 8 wherein said step of transmitting said first information includes incorporating said first information in a data packet that is not destined for a client.

14. The method of claim 8 further including accumulating list of plural entries in said target network device, each entry having at least one QoS parameter.

15. The method of claim 8 wherein said first information is a list of plural entries, each entry having at least one QoS parameter.

16. The method of claim 15 wherein said second information includes an index and said step of changing said QoS includes indexing into said list on the basis of said index.

17. In a network device, a method for setting a quality of service (QoS) configuration comprising steps of:

acquiring at least one QoS parameter from an external source;

receiving data packets from said external source, first types of which are to be transmitted from said network device and second types of which are to be retained within said network device;

for each received data packet, inspecting it for information of a first kind; and in response to detecting said information of said first kind, setting said QoS configuration in accordance with said at least one QoS parameter;

wherein said information of said first kind is contained in a data packet of a first type and said step of setting said QoS configuration is performed prior to transmitting said data packet.

18. In a network device, a method for setting a quality of service (QoS) configuration comprising steps of:

acquiring at least one QoS parameter from an external source;

receiving data packets from said external source, first types of which are to be transmitted from said network device and second types of which are to be retained within said network device;

for each received data packet, inspecting it for information of a first kind; and in response to detecting said information of said first kind, setting said QoS configuration in accordance with said at least one QoS parameter;

wherein said information of said first kind is contained in a data packet of a first type, said step of setting said QoS configuration is performed subsequent to transmitting said first type of data packet.

19. The method of claim 17 wherein said step of acquiring at least one QoS parameter includes extracting said at least one QoS parameter from a received data packet.

20. The method of claim 19 wherein said at least one QoS parameter is contained in a data packet of a first type.

21. The method of claim 17 further including producing a list of plural entries, each entry containing one or more QoS parameters, said list thereby defining a list of QoS configurations.

22. The method of claim 17 wherein said step of acquiring at least one QoS parameter includes receiving a list of QoS parameters, said list containing plural entries, each entry containing one or more QoS parameters.

23. The method of claim 22 wherein said information of said first kind includes index information and said step of setting said QoS configuration includes indexing into said list based on said index information.

24. A network device comprising:

network circuitry configured for connection to a network, said network circuitry effective for receiving data packets from said network;

data monitoring circuitry in data communication with said network circuitry and configured to detect the presence of a received data packet containing first information;

control circuitry operatively coupled to said network circuitry and to said data monitoring circuitry;

a memory in data communication with said control circuitry and configured to contain service information including a current quality of service (QoS) setting;

first program code to operate said control circuitry in a manner to receive one or more externally provided QoS parameters; and second program code to operate said control circuitry in a manner to alter said service information in accordance with said QoS parameters in response to said data communication circuitry detecting said received data packet containing said first information, thereby changing said current QoS setting.

25. The device of claim 24 wherein said data monitoring circuitry is a portion of said memory, said portion being configured to contain a third program to operate said control circuitry in a manner to detect said first information in said received data packet.

26. The device of claim 24 further including third program code to operate said control circuitry in a manner to transmit said received data packets, said second program code and said third program code configured so that said QoS is altered prior to transmission of the received data packet containing said first information.

27. The device of claim 24 further including third program code to operate said control circuitry in a manner to transmit said received data packets, said second program code and said third program code configured so that said QoS is altered subsequent to transmission of the received data packet containing said first information.

28. The device of claim 24 wherein said one or more QoS parameters are contained in at least one of said received data packets.

29. The device of claim 24 wherein said received data packets include first type data packets which are transmitted from said network device and second type data packets which are retained in said network device, said first information being contained in said second type data packets.

30. The device of claim 24 wherein said received data packets include first type data packets which are transmitted from said network device and second type data packets which are retained in said network device, said one or more QoS parameters being contained in said second type data packets.

31. The device of claim 24 further including second memory configured to contain a list of plural QoS settings, each QoS setting comprising at least one QoS parameter.

32. The device of claim 24 wherein said first information is a list containing plural entries of QoS parameters, each entry of QoS parameters representing a different QoS setting.

33. The device of claim 32 wherein said first information includes index information effective for specifying an entry in said list, said index information thereby specifying one of said QoS settings.

34. The method claim 4 wherein said at least one network device attribute includes a QoS setting.

35. The method of claim 4 wherein said first information includes an address of said target network device.

36. The method of claim 4 wherein said step of transmitting said first information includes incorporation said first information in a data packet destined for a client.

37. The method of claim 4 wherein said step of transmitting said first information includes incorporating said first information in a data packet that is not destined for a client.

38. The method claim 5 wherein said at least one network device attribute includes a QoS setting.

39. The method of claim 5 wherein said first information includes an address of said target network device.

40. The method of claim 5 wherein said step of transmitting said first information includes incorporation said first information in a data packet destined for a client.

41. The method of claim 5 wherein said step of transmitting said first information includes incorporating said first information in a data packet that is not destined for a client.

42. The method of claim 10 wherein said first information includes an address of said target network device.

43. The method of claim 10 wherein said step of transmitting said first information includes incorporating said first information in a data packet destined for a client.

44. The method of claim 10 wherein said step of transmitting said first information includes incorporating said first information in a data packet that is not destined for a client.

45. The method of claim 10 further including accumulating list of plural entries in said target network device, each entry having at least one QoS parameter.

46. The method of claim 10 wherein said first information is a list of plural entries, each entry having at least one QoS parameter.

47. The method of claim 46 wherein said second information includes an index and said step of changing said QoS includes indexing into said list on the basis of said index.

48. The method of claim 11 wherein said first information includes an address of said target network device.

49. The method of claim 11 wherein said step of transmitting said first information includes incorporating said first information in a data packet destined for a client.

50. The method of claim 11 wherein said step of transmitting said first information includes incorporating said first information in a data packet that is not destined for a client.

51. The method of claim 11 further including accumulating list of plural entries in said target network device, each entry having at least one QoS parameter.

52. The method of claim 11 wherein said first information is a list of plural entries, each entry having at least one QoS parameter.

53. The method of claim 52 wherein said second information includes an index and said step of changing said QoS includes indexing into said list on the basis of said index.

54. The method of claim 18 wherein said step of acquiring at least one QoS parameter includes extracting said at least one QoS parameter from a received data packet.

55. The method of claim 54 wherein said at least one QoS parameter is contained in a data packet of a first type.

56. The method of claim 18 further including producing a list of plural entries, each entry containing one or more QoS parameters, said list thereby defining a list of QoS configurations.

57. The method of claim 18 wherein said step of acquiring at least one QoS parameter includes receiving a list of QoS parameters, said list containing plural entries, each entry containing one or more QoS parameters.

58. The method of claim 57 wherein said information of said first kind includes index information and said step of setting said QoS configuration includes indexing into said list based on said index information.

* * * * *